(12) United States Patent
Suzuki

(10) Patent No.: US 12,157,959 B2
(45) Date of Patent: Dec. 3, 2024

(54) SILICA GLASS YARN AND SILICA GLASS CLOTH

(71) Applicant: SHIN-ETSU QUARTZ PRODUCTS CO., LTD., Tokyo (JP)

(72) Inventor: Kentaro Suzuki, Tokyo (JP)

(73) Assignee: SHIN-ETSU QUARTZ PRODUCTS CO., LTD., Tokyo (JP)

( * ) Notice: Subject to any disclaimer, the term of this patent is extended or adjusted under 35 U.S.C. 154(b) by 359 days.

(21) Appl. No.: 17/042,604

(22) PCT Filed: Oct. 25, 2019

(86) PCT No.: PCT/JP2019/041861
§ 371 (c)(1),
(2) Date: Sep. 28, 2020

(87) PCT Pub. No.: WO2020/105363
PCT Pub. Date: May 28, 2020

(65) Prior Publication Data
US 2021/0310161 A1    Oct. 7, 2021

(30) Foreign Application Priority Data

Nov. 22, 2018  (JP) ................................. 2018-219371
Apr. 4, 2019  (JP) ................................. 2019-071887

(51) Int. Cl.
*D03D 15/267*    (2021.01)
*C03B 37/025*    (2006.01)
(Continued)

(52) U.S. Cl.
CPC ......... *D03D 15/267* (2021.01); *C03B 37/025* (2013.01); *C03C 3/06* (2013.01);
(Continued)

(58) Field of Classification Search
CPC .. D03D 15/267; D03D 15/513; D03D 1/0035; D03D 1/0082; D03D 1/00;
(Continued)

(56) References Cited

U.S. PATENT DOCUMENTS

| | | | | |
|---|---|---|---|---|
| 4,830,647 | A | * | 5/1989 | Watabe .............. B65H 54/2893 65/453 |
| 2010/0184345 | A1 | * | 7/2010 | Lalande .................. C03C 3/087 442/1 |
| 2015/0099090 | A1 | * | 4/2015 | Faurie .................... B01J 21/063 428/92 |

FOREIGN PATENT DOCUMENTS

| | | |
|---|---|---|
| CN | 1685098 A | 10/2005 |
| JP | 2001172038 A * | 6/2001 ....... C03B 37/01228 |

(Continued)

OTHER PUBLICATIONS

High Silica Glass Fiber Wick For E-cigarette [online], Feb. 26, 2018 [retrieved on May 22, 2019], Internet: <URL: https://web.archive.org/web/20180226211559/http://www.cyccomposites.net/sale-8446008-highsilica-glass-fiber-wick-for-e-cigarette.html>.
(Continued)

*Primary Examiner* — Lynda Salvatore
(74) *Attorney, Agent, or Firm* — McGlew and Tuttle, P.C.

(57) ABSTRACT

Provided are a silica glass yarn and a silica glass cloth which have a signal transmission speed that is made stable through stabilization of a characteristic impedance in addition to a low dielectric constant and a low loss. The silica glass yarn has a yarn habit density of 0.10 piece/cm or less of yarn habits each having a bending point with a radius of curvature of 5 mm or less and a bending angle of 120° or less. It is preferred that the silica glass yarn have a tensile strength of 2.0 GPa or more, and silica glass filaments forming the silica
(Continued)

glass yarn each have a breaking start strength of 80.0% or more of the tensile strength of the silica glass yarn.

14 Claims, 5 Drawing Sheets

(51) Int. Cl.
| | | |
|---|---|---|
| *C03C 3/06* | (2006.01) | |
| *D02G 3/18* | (2006.01) | |
| *D02G 3/26* | (2006.01) | |
| *D03D 1/00* | (2006.01) | |
| *D03D 15/41* | (2021.01) | |
| *D03D 15/573* | (2021.01) | |

(52) U.S. Cl.
CPC ............... *D02G 3/18* (2013.01); *D02G 3/26* (2013.01); *D03D 1/0035* (2013.01); *D03D 1/0082* (2013.01); *D03D 15/41* (2021.01); *D03D 15/573* (2021.01); *C03C 2201/02* (2013.01); *D10B 2101/06* (2013.01); *Y10T 428/2913* (2015.01); *Y10T 442/30* (2015.04); *Y10T 442/3976* (2015.04)

(58) Field of Classification Search
CPC ...... D03D 15/41; D03D 15/00; D03D 15/593; D02G 3/18; D02G 3/26; C03B 37/025; C03B 37/01; C03B 37/03; C03C 3/06; C03C 25/1095
USPC ......................................................... 428/365
See application file for complete search history.

(56) References Cited

FOREIGN PATENT DOCUMENTS

| | | | |
|---|---|---|---|
| JP | 2003-277092 | A | 10/2003 |
| JP | 2004-315290 | A | 11/2004 |
| JP | 2006-103995 | A | 4/2006 |
| JP | 2006-282401 | A | 10/2006 |
| JP | 2009263824 | A | 11/2009 |
| JP | 5177742 | B2 * | 4/2013 |
| JP | 2016-11484 | A | 1/2016 |
| JP | 2016-207776 | A | 12/2016 |

OTHER PUBLICATIONS

Silica Glass Fiber Yarn [online], Sep. 7, 2012 [retrieved on May 22, 2019], Internet: <URL: https://www.ecvv.com/product/3360675.html>.

* cited by examiner (A)

Filaments in yarn that is ultimately opened

Yarn width ($L_y$) = filament diameter ($D_f$) × number ($N_f$) of filaments in yarn

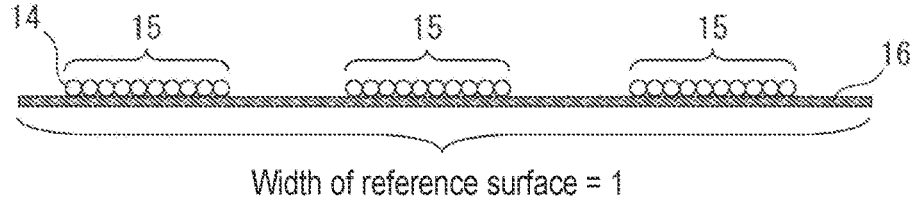

Width of reference surface = 1

(B)

L = Total width of filaments with respect to width of reference surface in ultimately opened state
= Yarn width ($L_y$) × number ($N_y$) of yarns in width of reference surface 1 − L = Width of portion without filaments

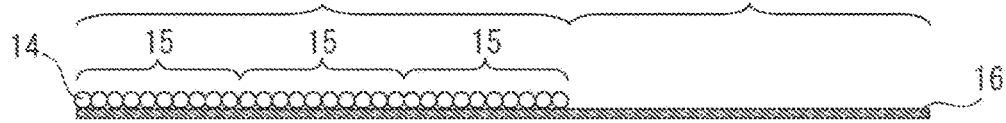

(C)

Thickness of filament portion $D_f$    Thickness of portion without filaments 0

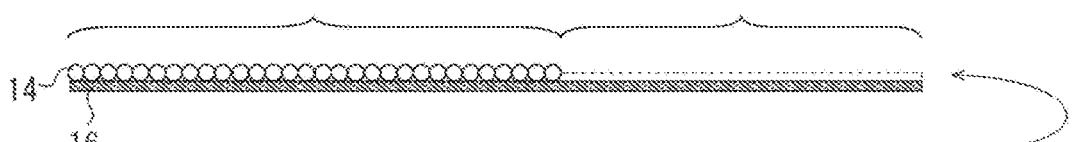

Average thickness of cloth per width of reference surface $T_{ave} = D_f \times L$

FIG.8

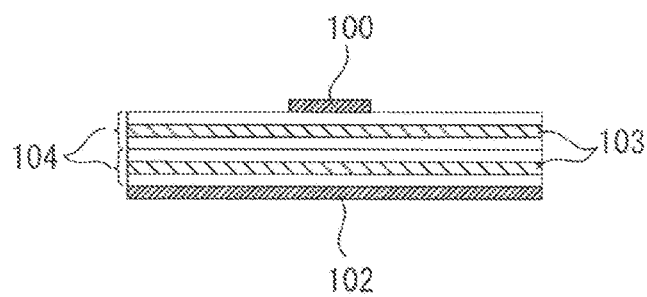

SILICA GLASS YARN AND SILICA GLASS CLOTH

TECHNICAL FIELD

The present invention relates to a silica glass yarn and a silica glass cloth to be suitably used in a high-frequency printed wiring board.

BACKGROUND ART

In the 5th generation mobile communication standard scheduled to be put into operation as early as 2020, it is said that a high frequency in the 28 GHz band is used in addition to the 6 GHz band or lower that has hitherto been used. Further, in the 6th generation mobile communication standard, which is the next generation mobile communication standard, part of a high frequency in the millimeter wave band is also planned to be used.

In addition to mobile communication, along with the widespread use of IoT/M2M, the frequency of electronic circuits constituting all network devices is increasing in response to data that is rapidly increasing also in the field of data communication. For example, in IEEE 802ad, which is one of the WiFi communication standards that are currently being developed, the 60 GHz band has started being used.

In a high-frequency printed circuit board to be used in communication devices and network devices adaptable to such a high frequency, low-loss and low-delay signal processing is required. Along with this, a glass cloth to be used in the high-frequency printed circuit board is also required to have a low dielectric constant and a low loss.

For example, in Patent Document 1, there has been proposed a silica glass cloth having excellent surface smoothness, less variation in mass and thickness, and excellent dimensional stability, which is obtained by controlling the feed speed of an ingot serving as a raw material for a quartz glass thick fiber into a furnace and controlling the drawing speed of the quartz glass thick fiber serving as a raw material for a quartz glass filament.

Meanwhile, along with an increase in data transmission rate, a data transmission system between network devices has also changed from a conventional parallel transmission system to a high-speed differential serial transmission system, and as the characteristics required in the high-frequency printed circuit board, a signal transmission speed through stabilization of a characteristic impedance is becoming an important factor in addition to a low dielectric constant and a low loss.

For example, in Patent Document 2, there has been proposed multilayer printed wiring in which signal quality is ensured and high-speed signal transmission can be satisfactorily performed by designing wiring through adoption of diagonal wiring so as to reduce an impedance change and a propagation delay time difference caused by a difference in specific dielectric constant between a glass cloth and a resin, to thereby preliminarily assume and solve a problem of a resonant frequency that occurs secondarily.

PRIOR ART DOCUMENT

Patent Document

Patent Document 1: JP 2016-11484 A
Patent Document 2: JP 2016-207776 A

DISCLOSURE OF THE INVENTION

Problems to be Solved by the Invention

However, in the case of Patent Document 1, although a silica glass cloth having a low dielectric constant and a low loss is obtained, a signal transmission speed through stabilization of a characteristic impedance is further required in addition to the foregoing in consideration of the use in the high-frequency printed circuit board.

In addition, in the case of Patent Document 2, a difference in dielectric characteristics caused by a change in specific dielectric constant depending on the location due to the distribution state of glass fibers and a resin present in a sectional direction is not avoided by changing the physical properties of the glass cloth itself but is avoided through design by circuit arrangement. Therefore, the difference itself in specific dielectric constant between the glass cloth and the resin present in the board itself is not reduced.

The present invention has been made in view of the above-mentioned circumstances, and an object of the present invention is to provide a silica glass yarn and a silica glass cloth which have a signal transmission speed that is made stable through stabilization of a characteristic impedance in addition to a low dielectric constant and a low loss.

Means for Solving Problems

The inventors of the present invention have made extensive investigations in order to solve the above-mentioned problems, and as a result, have found that, regarding the silica glass cloth forming the high-frequency printed circuit board, the flatness of the silica glass cloth and defects of the silica glass cloth are significantly involved in the above-mentioned problems. Further, from those viewpoints, the inventors of the present invention have found that, regarding the silica glass yarn serving as a raw material, it is important that the number of bending points ascribed to yarn habits be small, to thereby achieve the present invention.

That is, according to one embodiment of the present invention, there is provided a silica glass yarn, which has a yarn habit density of 0.10 piece/cm or less of yarn habits each having a bending point with a radius of curvature of 5 mm or less and a bending angle of 120° or less.

It is preferred that the silica glass yarn have a tensile strength of 2.0 GPa or more, and silica glass filaments forming the silica glass yarn each have a breaking start strength of 80.0% or more of the tensile strength of the silica glass yarn.

It is suitable that silica glass filaments forming the silica glass yarn each have a filament diameter of from 3.0 μm to 10.0 μm, a number of the silica glass filaments be from 20 to 300, and a number of twists of the silica glass yarn be from 4 twists/m to 24 twists/m.

According to another embodiment of the present invention, there is provided a silica glass cloth, which is obtained by weaving and opening using the silica glass yarn according to the one embodiment of the present invention.

It is preferred that the silica glass cloth has an average value of a cloth thickness, which is measured with an electronic micrometer under a measuring pressure of 63.2 kPa, of from 100% to 110% of an average value of a cloth thickness, which is measured with the electronic micrometer under a measuring pressure of 176.8 kPa.

It is suitable that the silica glass cloth has a variation coefficient of a cloth thickness, which is measured with an electronic micrometer under a measuring pressure of 63.2 kPa, within 10%.

Advantageous Effects of the Invention

According to the present invention, through use of the silica glass yarn in which the number of bending points ascribed to yarn habits is small, the silica glass cloth which has excellent flatness, and which has a signal transmission speed that is made stable through stabilization of a characteristic impedance in addition to a low dielectric constant and a low loss can be provided.

BRIEF DESCRIPTION OF DRAWINGS

In FIG. 1, (a) is an enlarged schematic view for illustrating a method of measuring the yarn habit, and (b) to (d) are each an enlarged view of a main part of (a).

In FIG. 6, (A) is an explanatory graph showing a case in which all the silica glass filaments have the same tensile strength, (B) is an explanatory graph showing a case in which there is variation in tensile strength of the silica glass filaments.

FIG. 7 is an explanatory view for schematically illustrating the flatness of a silica glass cloth in the case where it is assumed that the silica glass cloth is ultimately opened.

FIG. 8 is a sectional view of a characteristic impedance measuring board of the silica glass cloth of the present invention.

DESCRIPTION OF EMBODIMENTS

Now, the present invention is described in detail.
(1) Silica Glass Yarn

As used herein, a thin thread-like single fiber obtained by drawing silica glass is defined as "silica glass filament", the silica glass filaments that are bundled are defined as "silica glass strand", and the silica glass strands that are bundled and twisted are defined as "silica glass yarn".

The silica glass yarn of the present invention has a yarn habit density of 0.10 piece/cm or less, preferably 0.08 piece/cm or less, more preferably 0.05 piece/cm or less.

Figure 1:
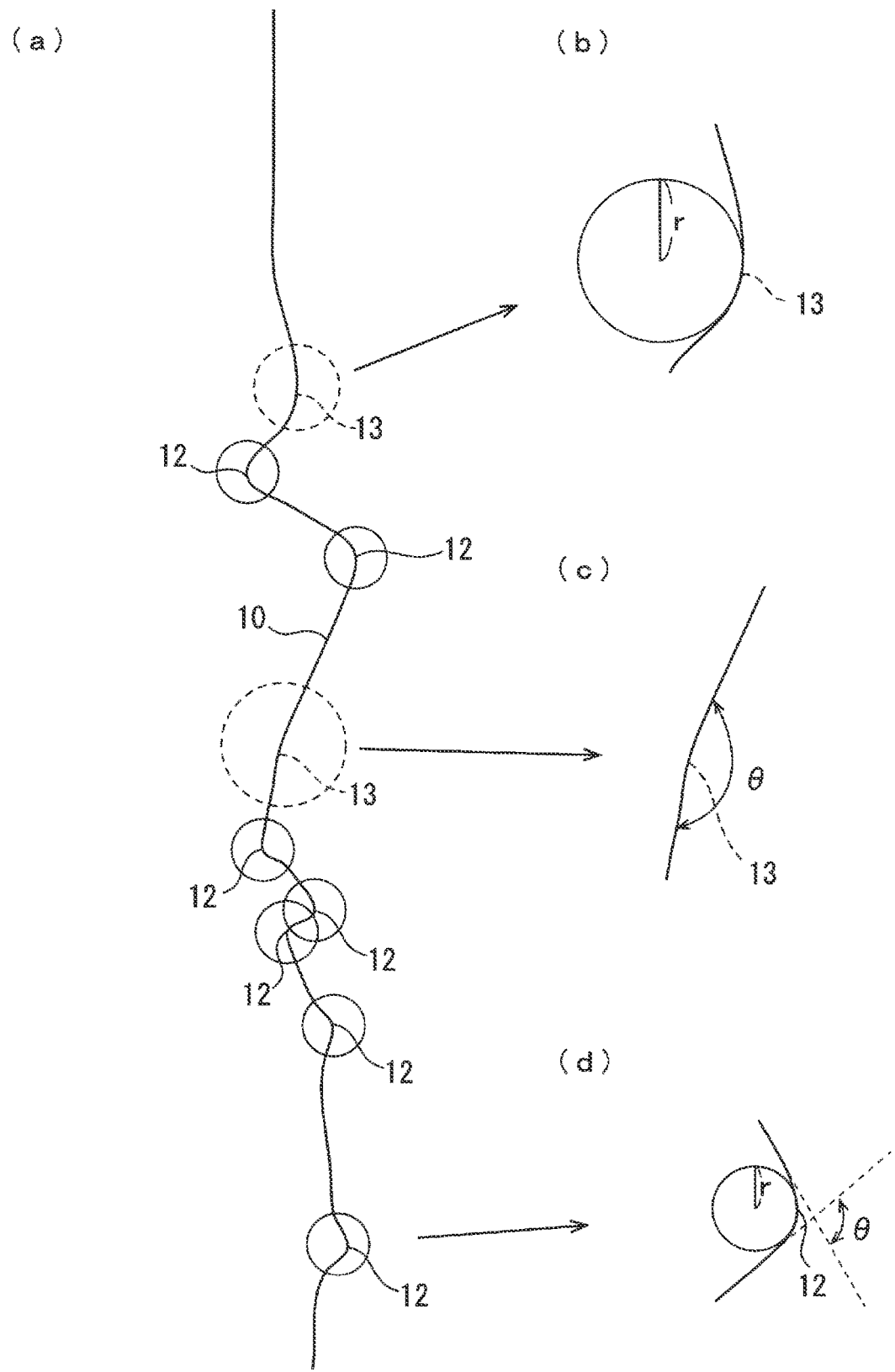
FIG. 1 is an explanatory view for illustrating a yarn habit of a silica glass yarn.

FIG. 1 is an explanatory view for illustrating a yarn habit of the silica glass yarn. In FIG. 1, (a) is an enlarged schematic view for illustrating a method of measuring the yarn habit, and (b) to (d) are each an enlarged view of a main part of (a). In FIG. 1, there is illustrated a silica glass yarn 10. There is illustrated a bending point 12 of the silica glass yarn. In FIG. 1, the bending point 12 of the silica glass yarn ascribed to a yarn habit is indicated by the outlined circle. There is illustrated a curved portion 13 that is not the bending point of the present application. The yarn habit of the silica glass yarn 10 of the present invention is a large bend observed when the yarn is slightly loosened. The yarn habit is measured as described below. A radius of a curve formed in the silica glass yarn is defined as a radius of curvature, and a bending portion having a curve with a radius of curvature of 5 mm or less and a bend with a bending angle of 120° or less is defined as the bending point. The number of bending points is measured as the number of yarn habits, to thereby calculate a yarn habit density.

Specifically, out of the silica glass yarn 10 wound around a bobbin, the silica glass yarn wound in an outermost layer is used as a test yarn. When the yarn habit of the silica glass yarn in a state of being wound around the bobbin is to be inspected, the silica glass yarn in the outermost layer of the wound silica glass yarn is inspected for the following reason. When the test yarn is taken out from the silica glass yarn wound in a middle layer portion, it is required to remove the silica glass yarn wound in a layer on an outer side of the middle layer portion, which is wasteful. In addition, there is a risk in that an error in measurement may occur due to the influence of a winding pressure of the silica glass yarn wound in the layer on the outer side of a sample portion.

After an upper end portion of the silica glass yarn 10 is fixed with fixing means, the silica glass yarn 10 is pulled with such a load that the silica glass yarn 10 is not stretched but is straightened at an initial load of 2.94 mN described in a) of "5.1 Initial Load" of "5. Test method" of JIS L 1013: 2010 "Testing Methods for Man-made Fiber Filament Yarns". In this state, a lower end portion of the silica glass yarn 10 is fixed with fixing means so that a fixing interval L reaches 400 mm. After that, while the upper and lower ends of the silica glass yarn 10 are fixed, an interval between the upper and lower ends is reduced by 1 mm (0.25%), to thereby adjust the fixing interval L to 399 mm. When the fixing interval is reduced, the pulled silica glass yarn 10 is loosened. Images of the silica glass yarn in this state are taken in all directions. Through use of the images, a radius of curvature r and a bending angle θ of each bend formed in the silica glass yarn 10 are measured through use of image analysis software. The bending portion 12 having a radius of curvature r of 5 mm or less and a bending angle θ of 120° or less is defined as the bending point, and the number of bending points is counted. A small bend having a radius of curvature r of more than 5 mm or having a bending angle θ of more than 120° is not counted as the yarn habit. Out of the measured images in all directions, the results of the image in which the number of bending points is the largest are adopted. The number of bending points is defined as the number of yarn habits of the silica glass yarn, and thus the yarn habit density can be calculated.

FIG. 1(b) to FIG. 1(d) are each an explanatory view for schematically illustrating the radius of curvature r or the bending angle θ of the curved portion formed in the silica glass yarn 10. As illustrated in FIG. 1(d), as used herein, the bending point 12 ascribed to the yarn habit refers to the bending portion having a bend with a radius of curvature r of 5 mm or less and a bending angle θ of 120° or less. The curved portion 13 illustrated in FIG. 1(b) has a radius of curvature r of more than 5 mm, and hence is not the bending point in the present application. Similarly, the curved portion 13 illustrated in FIG. 1(c) has a bending angle θ of more than 120°, and hence is not the bending point in the present application.

When the yarn habit density is more than 0.1 piece/cm, the silica glass yarns are liable to be interlaced, and the flatness of a resultant silica glass cloth is lowered. Further, the slippage between the silica glass yarns deteriorates due to the interlacing between the silica glass yarns, making it difficult to obtain the effect of opening treatment after weaving, and the flatness of the silica glass cloth after the opening treatment is lowered. The lower limit of the yarn habit density is 0.00 pieces/cm because it is preferred that the silica glass yarn have no bending point ascribed to the yarn habit.

The silica glass yarn has a softening point of from 1,600° C. to 1,710° C., which is significantly higher than those of the other glasses (for example, E glass has a softening point of 840° C.). Therefore, the silica glass yarn has the following properties. When the glass is processed into a filament shape, all the filaments are promptly cooled, with the result that the filaments are brittle in terms of a structure, have insufficient flexibility, and are liable to cause the yarn habits.

When the silica glass yarn is woven, a large tension is applied thereto during weaving, but the tension is released after the weaving. In this case, when a silica glass yarn having a high yarn habit density (having a large number of bending points ascribed to the yarn habits) is used, the yarn habits remain as minute surface irregularities even after the silica glass yarn becomes a silica glass cloth and remain without being improved even after the subsequent opening treatment. Therefore, in order to obtain a silica glass cloth having high flatness, it is preferred that the yarn habit density be low (the number of bending points ascribed to the yarn habits be small).

In the present invention, a silica glass cloth is obtained by weaving using the silica glass yarns each having a small number of bending points ascribed to the yarn habits. Thus, the interlacing between the silica glass yarns in the silica glass cloth is alleviated, to thereby achieve an effect of flattening the silica glass cloth. Further, the slippage between the silica glass yarns is improved due to the alleviation of the interlacing between the silica glass yarns. With this, the opening treatment is efficiently performed, and a flat silica glass cloth can be stably produced as a synergetic effect.

From the viewpoint of not causing defects, such as fluff, at the time of weaving of the silica glass yarns, or from the viewpoint of being capable of sufficiently performing opening at an appropriate water pressure when the woven silica glass cloth is opened, the tensile strength of the silica glass yarn is preferably 2.0 GPa or more, more preferably 2.4 GPa or more, still more preferably 2.7 GPa or more.

As used herein, the tensile strength of the silica glass yarn is measured by a method specified in "7.4 Tensile Strength", in particular, "7.4.3 Glass Yarn and Roving" of JIS R 3420: 2013 "Testing Methods for Textile Glass Products". In the present application, of the three tensile test methods described in 7.4.1 of the same JIS R 3420, "a) Constant-rate-of-extension Type Tensile Testing Method (CRE)" is adopted. An arithmetic average of breaking forces is obtained in terms of newton (N) as a unit from breaking forces of ten test pieces. Further, the stress thereof is divided by the sectional area of the silica glass yarn (sum of the sectional areas of silica glass filaments forming the silica glass yarn), and the resultant is converted into a pressure. The value of the pressure is defined as the tensile strength.

A strength distribution of the silica glass filaments in the silica glass yarn of the present invention is an important factor for preventing partial rupture of the silica glass yarn. The partial rupture of the silica glass yarn becomes a quality problem as fluff of the silica glass yarn. The fluff of the silica glass yarn causes yarn breakage during weaving to hinder the weaving. Even when the fluff does not cause the yarn breakage, the fluff remains as cloth fluff to cause an insulation failure in a circuit board using the cloth.

However, a silica glass yarn having fluffing observed in a yarn stage can be excluded in an inspection step, and hence there are less direct effects on the flatness and fluff of the silica glass cloth. Rather, there arises a problem in that the silica glass yarn is partially ruptured in a weaving step and an opening step to cause fluff due to the strength distribution of the silica glass filaments present in the silica glass yarn.

In particular, in the opening treatment step performed by causing the fibers to slide on each other through use of a high-pressure water jet water stream, an intense pressure is applied to the silica glass yarn itself. Therefore, when a weak filament is partially present in the silica glass yarn, partial rupture of the silica glass yarn is liable to occur.

When a filament having low strength is present in the silica glass yarn, pressure conditions originally required cannot be set in order to prevent partial rupture, and hence the flatness of the resultant silica glass cloth is lowered.

In view of the foregoing, in the present invention, such partial rupture of the silica glass yarn is predicted in advance by examining a stress-strain curve in a breaking test of the silica glass yarn, and thus a silica glass yarn with less surface defects can be obtained.

Figure 6:
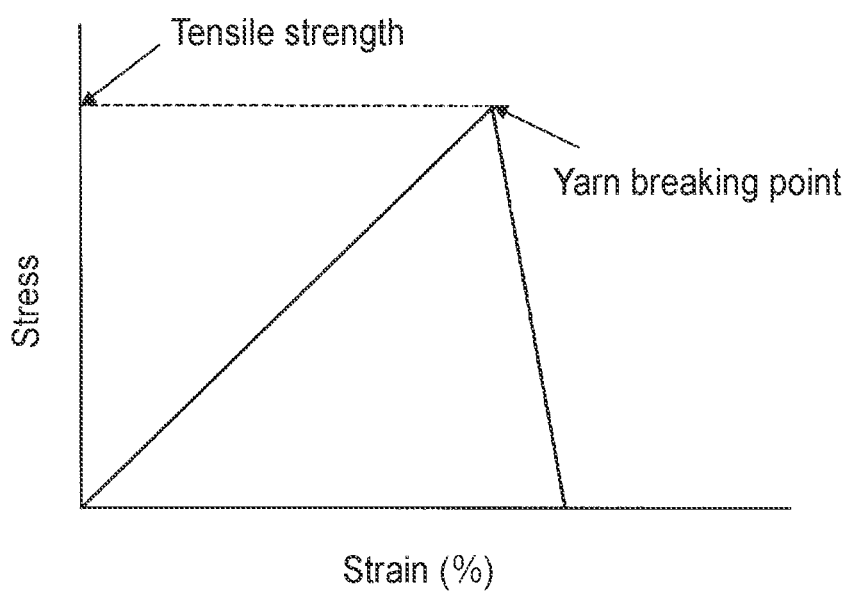
FIG. 6 is an explanatory graph schematically showing a stress-strain curve of a silica glass yarn.
Figure 6:
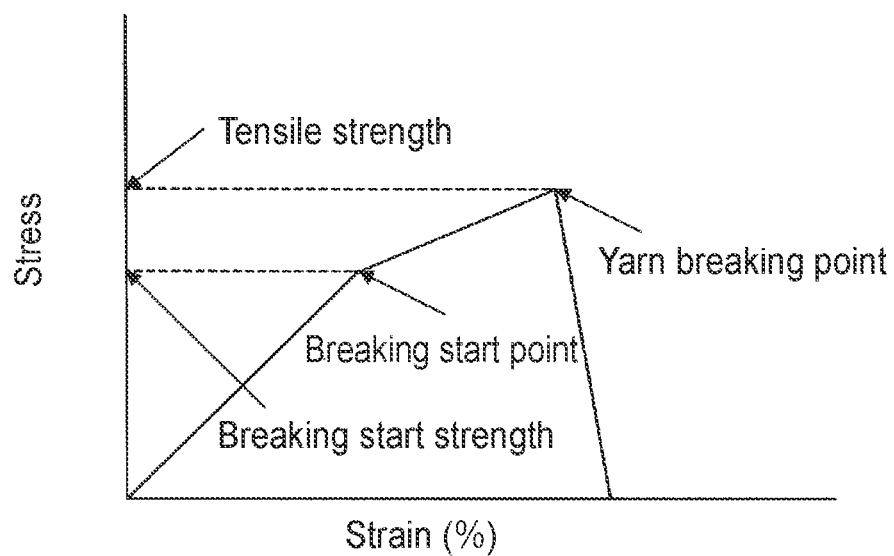

FIG. 6 is an explanatory graph schematically showing the stress-strain curve of the silica glass yarn. In FIG. 6, (A) is an explanatory graph showing a case in which all silica glass filaments have the same tensile strength, and (B) is an explanatory graph showing a case in which there is variation in tensile strength of the silica glass filaments.

As used herein, the stress-strain curve is a curve obtained by plotting a strain of the silica glass yarn (strain: a value obtained by dividing a distance between grips by a grip interval of 250 mm, which is expressed in terms of %) on the horizontal axis and plotting a stress (tension applied between ends of the silica glass yarn) on the vertical axis, as shown in FIG. 6, according to the "Constant-rate-of-extension Type Tensile Testing Method (CRE)" specified in a) of "7.4.1 Tensile Testing Method" of JIS R 3420: 2013 "Testing Methods for Textile Glass Products".

When all the silica glass filaments forming the silica glass yarn have the same tensile strength, the silica glass yarn is broken at a certain stress at one time as shown in FIG. 6(A). A value obtained by converting the stress at which the silica glass yarn is broken into a pressure is the tensile strength in the present application.

Meanwhile, in actuality, the silica glass filaments forming the silica glass yarn have variation in strength. In this case, the silica glass filaments having lower strength are sequentially broken along with an increase in strain. As shown in FIG. 6(B), due to the breakage of part of the silica glass filaments, the substantial sectional area of the silica glass yarn is decreased, and the stress applied to the silica glass yarn is increased as a pressure. Therefore, an increase rate of the stress (slope of the curve) to the strain on the stress-strain curve is changed. As a result, an inflection point is generated in the stress-strain curve. The inflection point was defined as a breaking point. A value obtained by dividing a stress at the breaking point by the sectional area of the silica glass yarn at the start of the tensile test and converting the resultant into a pressure was referred to as "strength at the breaking point". Of the breaking points, an initial breaking point was defined as a breaking start point, and strength at the breaking start point was defined as a breaking start strength. The partial rupture of the silica glass filaments occurred at any point between the breaking start strength and the tensile strength, and hence the strength at the breaking start point was specified based on the tensile strength of the silica glass yarn.

From the viewpoint of preventing the partial breakage of the silica glass yarn, the breaking start point of the silica glass yarn is important. From the viewpoint of decreasing variation in strength of the silica glass filaments, the breaking start strength of the silica glass filament is preferably 80.0% or more, more preferably 85.0% or more, still more preferably 90.0% or more of the tensile strength of the silica glass yarn. The upper limit of the breaking start strength of the silica glass filament is 100.0%.

From the viewpoint of the thickness of the silica glass cloth, the filament diameter of the silica glass filament used in the silica glass yarn of the present invention is preferably from 3.0 μm to 10.0 μm, more preferably from 3.5 μm to 7 μm, still more preferably from 3.5 μm to 5.5 μm.

The filament diameter of the silica glass filament was measured as described below. The silica glass yarn was cut, and a cut surface thereof was photographed with an electronic microscope. Then, the diameter of the cut surface on the photograph was measured with calipers, and converted based on the magnification, to thereby calculate the filament diameter.

In addition, from the viewpoint of the thickness of the silica glass cloth or the strength of the silica glass yarn, the filament number of silica glass filaments is preferably from 20 to 300, more preferably from 25 to 200, still more preferably from 30 to 150.

A $SiO_2$ composition amount in the silica glass filament is preferably from 98.0 mass % to 100.0 mass %, more preferably from 99.0 mass % to 100.0 mass %, still more preferably from 99.5 mass % to 100.0 mass %.

A method of producing the silica glass filament to be used in the silica glass yarn involves spinning a silica glass ingot having desired roundness by a known spinning method. In order to obtain a silica glass yarn having a low yarn habit density, it is not sufficient only to control the feed speed of the silica glass ingot serving as a raw material for silica glass thick fibers into a furnace and control the winding speed of silica glass filaments as described in Patent Document 1, and it is further required to sufficiently ensure roundness of a cross section of the silica glass ingot serving as a raw material. For example, in the case of a silica glass ingot of from φ100 to 200 mm, it is preferred that the silica glass ingot be precisely polished so that the roundness reaches preferably 50 μm or less, more preferably 30 μm or less, still more preferably 20 μm or less.

A silica glass ingot having desired roundness is obtained, for example, by cylindrical grinding with a cylindrical grinder. Specifically, the surface of the silica glass ingot is ground while the silica glass ingot is held at both ends of a chuck of the cylindrical grinder and is slowly moved through use of a moving rotary grinding stone. In this case, for example, the cylindrical grinding is performed a plurality of times in a rough grinding step and a finishing step while changing and adjusting the roughness and the cutting amount of the rotary grinding stone. Specifically, in the rough grinding step, the silica glass ingot is processed through use of a rotary grinding stone having a roughness of preferably from #100/120 to #140/170, more preferably #120/140 when expressed by the JIS grain size so that the cutting amount reaches preferably from 0.010 mm to 0.030 mm, more preferably from 0.015 mm to 0.025 mm. In the subsequent finishing step, the resultant is processed through use of a rotary grinding stone having a roughness of preferably from #230/270 to #325/400, more preferably #270/325 when expressed by the JIS grain size so that the cutting amount reaches preferably from 0.005 mm to 0.010 mm, more preferably from 0.006 mm to 0.009 mm. After the cylindrical grinding is performed once, a sample having a thickness of 10 mm is cut out from the silica glass ingot, and the roundness thereof is measured. An operation of feeding back the result to the next cylindrical grinding is repeated a plurality of times, to thereby obtain a silica glass ingot having desired roundness.

As used herein, the roundness of the silica glass ingot refers to the degree of deviation of a circular shape from a geometrically correct circle defined in "4.3 Roundness" of JIS B 0621: 1984 "Definitions and Designations of Geometrical Deviations". Specifically, as specified in "5.3 Roundness", the roundness of the silica glass ingot refers to a difference between radii of two concentric geometric circles when a circular shape is sandwiched between the two circles, and the distance between the two circles is minimum. In the JIS, the unit of roundness is expressed in terms of mm or μm. However, in the present application, the roundness is a very minute value, and hence the unit of the roundness is expressed in terms of μm.

The roundness may be measured with a roundness measuring instrument (for example, ROUND TEST RA-2200 AS manufactured by Mitutoyo Corporation) that satisfies JIS B 7451: 1997 "Instruments for the Assessment of Departure from Roundness" by cutting the silica glass ingot serving as a raw material into a thickness of 10 mm.

Figure 2:
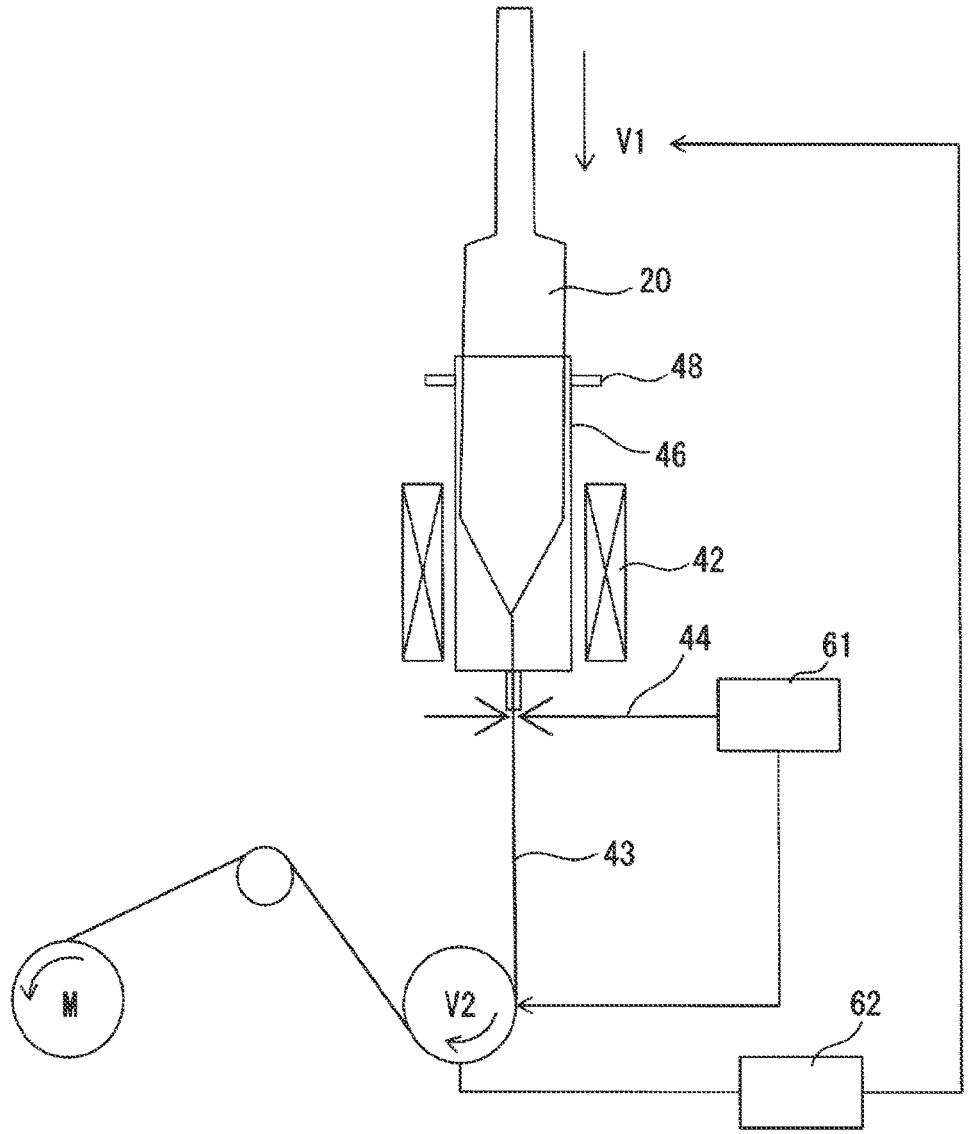
FIG. 2 is a schematic view of a resistance heating electric furnace configured to produce a silica glass thick fiber used in Example 1.

As a method of producing the silica glass yarn, for example, as illustrated in FIG. 2, a silica glass ingot 20 having desired roundness and having a diameter of from 50 mm to 200 mm is heated and drawn in a resistance heating electric furnace 42 to produce a silica glass thick fiber 43 having a diameter of from 100 μm to 300 μm. In this case, it is suitable that the outer diameter of the silica glass thick fiber be measured by a laser type outer diameter measuring device 44, and an insertion speed V1 of the silica glass ingot 20 into the resistance heating electric furnace and a winding speed V2 of the silica glass thick fiber be subjected to feedback control. In FIG. 2, there is illustrated a high-accuracy winding machine M configured to wind up the silica glass thick fiber 43. In addition, there are illustrated a core tube 46, a gas introduction pipe 48, a winding speed control unit 61 configured to control the winding speed of the silica glass thick fiber 43, and an ingot feed speed control unit 62 configured to control the feed speed of the silica glass ingot 20.

Further, in the case where the silica glass thick fiber is drawn, when there is local variation in outer diameter of the silica glass thick fiber, a strength distribution is generated in a finally obtained silica glass filament. Therefore, in order to suppress local variation in outer diameter of the silica glass thick fiber, it is preferred to take measures to minimize a temperature distribution in the resistance heating electric furnace. Specifically, it is suitable that, in consideration of the kind of an inert gas to be introduced into the resistance heating electric furnace so as to protect a heater, the introduction path thereof, the gas flow rate, and the like, care be taken so that temperature uniformity in the resistance heating electric furnace is not disturbed by the inert gas.

Figure 4:
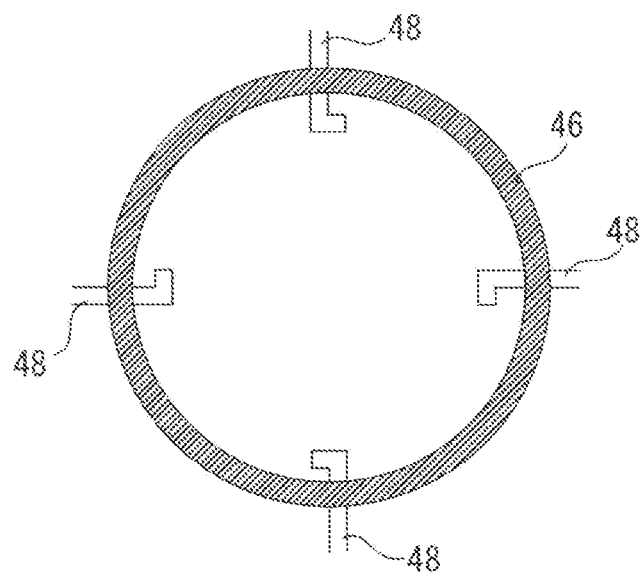
FIG. 4 is a sectional view of gas introduction parts of a modified resistance heating electric furnace used in Example 1.
Figure 5:
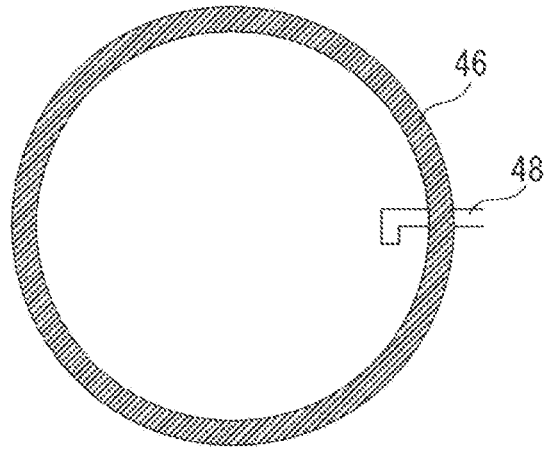
FIG. 5 is a sectional view of a gas introduction part of a conventional furnace.

For example, it is preferred that the number of introduction paths for a protective gas, such as a nitrogen gas, into the resistance heating electric furnace be increased from one path in the related art (FIG. 5) to a plurality of paths (four gas introduction pipes in FIG. 4), and the gas be caused to flow through the four gas introduction pipes 48 provided with independent pressure regulators and independent flow meters so that the gas flow rate from each part becomes uniform from a lower portion to an upper portion of the resistance heating electric furnace.

Figure 3:
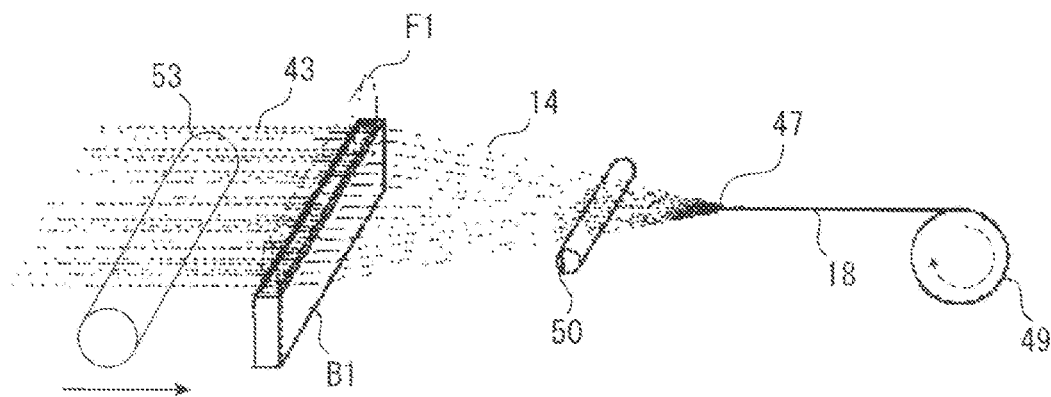
FIG. 3 is an explanatory view for schematically illustrating a method of producing silica glass filaments used in Example 1.

A silica glass strand is produced from the produced silica glass thick fiber 43 as described below. As illustrated in FIG. 3, a plurality of silica glass thick fibers 43 each having a diameter of from 100 μm to 300 μm are introduced into burner flame F1 obtained from a wide oxyhydrogen flame burner B1 while the feed speed is controlled through control of the rotation number of a feed roller 53. Simultaneously with this, the silica glass thick fibers 43 are wound up by a winder 49 while being bundled from an opposite direction of the burner through a sizing applicator 50 and a condenser 47. Thus, the silica glass thick fibers 43 are heated and drawn to produce 30 to 100 silica glass filaments 14. A sizing agent is applied to the silica glass filaments 14 with the sizing applicator 50, and after that, the silica glass filaments 14 are condensed by the condenser 47 to produce a silica glass strand 18. After that, the produced silica glass strand 18 is wound up by the winder 49. In this method, the silica glass filaments 14 each having a diameter of from 3.0 μm to 10.0 μm can be obtained.

The silica glass yarn of the present invention can be produced by twisting the silica glass strand with a predetermined number of twists through use of a twisting machine.

From the viewpoint of easy opening of the silica glass cloth (opening is performed more easily as the number of twists is smaller) and the strength of the silica glass yarn (the strength is higher as the number of twists is larger), the number of twists is preferably from 4 twists/m to 24 twists/m, more preferably from 4 twists/m to 16 twists/m, still more preferably from 4 twists/m to 12 twists/m.

In addition, in order to reduce the strength distribution of the silica glass filaments forming the silica glass yarn throughout all the production steps of the silica glass yarn, it is preferred to consider deformation and flaws of a condenser (spinning step), a spiral wire (spinning step), a yarn guide (twisting step), and a traveler (twisting step), which are present in a yarn path during spinning or twisting. Specifically, the silica glass yarn is very hard and brittle, and hence is liable to damage members with which the silica glass yarn is brought into contact. Meanwhile, the silica glass yarn itself is also liable to be damaged. Therefore, it is desired that portions with which the silica glass filaments and the silica glass yarn are brought into contact be always thoroughly inspected, and when flaws are found therein, components having the flaws be immediately replaced by components without flaws.

(2) Silica Glass Cloth

The silica glass cloth of the present invention is produced through use of the silica glass yarn of the present invention. There is no particular limitation on a method of producing the silica glass cloth, and the silica glass cloth may be produced by a known method. Specifically, the silica glass cloth of the present invention is a cloth obtained by weaving the silica glass yarn of the present invention through plain weaving or the like by an ordinary method, followed by opening, and includes warps and wefts (also known as fill yarns) that are arranged so as to periodically intersect each other. After that, as required, surface treatment is performed with a silane coupling agent, such as aminosilane, vinylsilane, or acrylsilane. In a printed circuit board formed by impregnating a silica glass cloth with a resin, when viewed microscopically, a resin amount at each intersection of the yarns of the cloth is small, and a resin amount in each stitch portion (gap between the warp and the weft) is large. A difference in specific dielectric constant between the silica glass cloth and the resin is large. Therefore, due to the relative change in resin amount, a microscopic dielectric constant distribution is generated in the board, and this distribution causes a difference in propagation speed of a high-frequency signal that propagates through an electronic circuit formed in an upper portion of the board.

In order to reduce the difference in specific dielectric constant in the printed circuit board caused by the yarn stitches generated on the board, after the silica glass yarns forming the silica glass cloth are woven, so-called opening treatment (sometimes referred to as "clogging treatment") involving spreading the silica glass filaments of the warp and weft with a water stream or the like is performed. With the sufficient opening treatment, filament bundles forming each silica glass yarn are sufficiently loosened. In plan view, the silica glass yarn is widened, whereas the stitches are narrowed. The thickness of the silica glass cloth is reduced.

In the present invention, the thickness of the silica glass cloth is preferably from 8 μm to 35 μm, more preferably from 10 μm to 30 μm.

In the case of using a silica glass yarn having a low yarn habit density, that is, fewer bending points ascribed to the yarn habits, a silica glass cloth having less irregularities on the surface is obtained. Specifically, the average value of a cloth thickness measured with an electronic micrometer under a measuring pressure of 63.2 kPa is preferably from 100% to 110%, more preferably from 100% to 108%, still more preferably from 100% to 105% of the average value of a cloth thickness measured with the electronic micrometer under a measuring pressure of 157.9 kPa.

Herein, the thickness of the silica glass cloth is usually measured under pressure. Therefore, the irregularities on the surface of the silica glass cloth cannot be measured. In order to know the degree of irregularities, it is required to measure the thickness of the silica glass cloth substantially in an unweighted state.

However, the measurement of the thickness of the silica glass cloth in an unweighted state significantly varies depending on the sense of a measurer as to whether or not a distal end of a measuring device has come into contact with the surface of the silica glass cloth, and hence the reliability of an obtained numerical value is poor. In view of the foregoing, in the present invention, the degree of irregularities on the surface of the silica glass cloth was determined by performing the measurement under 63.2 kPa, which is highly reliable and the lowest possible pressure that can be set by the measuring device, instead of the unweighted state, and comparing the result of the measurement to that obtained in the measurement under 157.9 kPa, which is a normal pressure.

The thickness of the silica glass cloth is measured with "2) Electronic Micrometer" of "a) Dead Weight Micrometer" of "7.10.1.1 Test Machine Equipment" of JIS R 3420: 2013 "Testing Methods for Textile Glass Products". Specifically, the measurement is performed with a micrometer (for example, a variable measuring force type digimatic micrometer "Soft Touch Micro CLM2-10QBM" manufactured by Mitutoyo Corporation) including a measuring pressure range of from 63.2 kPa to 157.9 kPa. The operation was performed in accordance with "b) Method B" of "7.10.1.4 Operation" of JIS R 3420:2013 "Testing Methods for Textile Glass Products" but under measuring pressures of 63.2 kPa and 157.9 kPa.

Herein, the measuring force can be changed by the variable measuring force type micrometer. Therefore, it is required to convert the measuring force into a measuring pressure by dividing the measuring force by the area of a measuring anvil. In the case of the variable measuring force type digimatic micrometer "Soft Touch Micro CLM2-

10QBM" manufactured by Mitutoyo Corporation given as an example, the measuring anvil has a diameter 6.35 mm. Therefore, the measuring pressures in the cases of the measuring force of 2 N and 5 N are 63.2 kPa and 157.9 kPa, respectively.

In addition, as shown in "c)" of the above-mentioned "7.10.1.4 Operation", the measurement of a cloth thickness was performed at five positions apart from each other by 75 mm or more, and an average value thereof was defined as the thickness of the silica glass cloth. Further, the variation thereof was obtained as a standard deviation, and the variation was divided by the average value of the thickness to obtain a variation coefficient. The measurement is performed under measuring pressures of 63.2 kPa and 157.9 kPa at each measuring point.

In addition, the variation coefficient of the thickness of the silica glass cloth measured with the electronic micrometer under a measuring pressure of 63.2 kPa is preferably within 10%, more preferably within 7%, still more preferably within 5%. Specifically, the flatness over the entire silica glass cloth can be made uniform by suppressing the variation coefficient of the thickness of the silica glass cloth.

As an indicator of the degree of opening, the flatness of the silica glass cloth is determined by the following expression (1).

[Mathematical 1]

$$\text{Flatness} = T_C / T_{ABS} \qquad (1)$$

In the expression (1), $T_C$ represents a thickness of the silica glass cloth, and $T_{ABS}$ represents an average thickness of the silica glass cloth when it is assumed that the silica glass cloth is ultimately opened.

FIG. 7 is an explanatory view for schematically illustrating the flatness of the silica glass cloth in the case where it is assumed that the silica glass cloth is ultimately opened. In FIG. 7, there are illustrated silica glass filaments 14 forming a warp silica glass yarn, a warp silica glass yarn 15 in an ultimately opened state, and a reference surface 16. The width of the reference surface is set to 1.

As used herein, the state in which the silica glass cloth is ultimately opened refers to a state in which the silica glass yarns forming the silica glass cloth and the silica glass filaments forming the silica glass yarn are distributed completely on a plane without any constraint and a state in which the thickness of the silica glass cloth is extremely thin (flat). In actuality, the silica glass yarn is twisted, and hence cannot be completely opened to be flattened. Therefore, the opened state is merely regarded as an indicator for quantifying the flatness.

Herein, as illustrated in FIG. 7(A), the filaments 14 forming the warp silica glass yarn in an ultimately opened state are all arranged on a plane, and hence a width ($L_y$) of the warp silica glass yarn may be represented by the following expression (2).

$$L_y = D_f \times N_f \qquad (2)$$

(In the expression (2), $D_f$ represents a filament diameter, and $N_f$ represents the number of filaments in the silica glass yarn.)

In the ultimately opened state, as illustrated in FIG. 7(B), the warp silica glass yarns themselves are all arranged on the reference surface, and hence a total width L of the filaments with respect to the width of the reference surface may be represented by the following expression (3).

$$L = L_y \times N_y \qquad (3)$$

(In the expression (3), $L_y$ represents a yarn width, and $N_y$ represents the number of yarns in the width of the reference surface.)

Therefore, as illustrated in FIG. 7(C), an average thickness $T_{ave}$ of the silica glass cloth per width of the reference surface is an average value of a silica glass filament portion (width: L, thickness: $D_f$) forming the warp silica glass yarn and a portion without the silica glass filaments (width: 1−L, thickness: 0), and hence may be represented by the following expression (4).

$$T_{ave} = D_f \times L \qquad (4)$$

When the expressions (2) to (4) are put together, the following expression (5) is obtained.

$$T_{ave} = D_f \times N_y \times D_f \times N_f = D_f^2 \times N_y \times N_f \qquad (5)$$

FIG. 7(A) to FIG. 7(C) are each a view for illustrating only the warp silica glass yarn, but an actual silica glass cloth also contains a weft (fill yarn) silica glass yarn. The weft silica glass yarn and the warp silica glass yarn intersect each other. When an increase in cloth thickness caused by the intersection is ignored, an ultimate silica glass cloth thickness $T_{ABS}$ can be regarded as a sum of a warp $T_{ave}$ and a weft $T_{ave}$. Thus, the following expression (6) is derived for the $T_{ABS}$.

[Mathematical 2]

$$T_{ABS} = (D_{Wf} \times N_{Wy} \times N_{Wf}) + (D_{Ff}^2 \times N_{Fy} \times N_{Ff}) \qquad (6)$$

(In the expression (6), $D_{Wf}$ represents a diameter (mm) of the silica glass filament forming the warp silica glass yarn; $N_{Wy}$ represents the number (pieces) of warp silica glass yarns per width of the reference surface; $N_{Wf}$ represents the number (pieces) of silica glass filaments forming the warp silica glass yarn; $D_{Ff}$ represents a diameter (mm) of the silica glass filament forming the weft silica glass yarn; $N_{Fy}$ represents the number (pieces) of weft silica glass yarns per width of the reference surface; and $N_{Ff}$ represents the number (pieces) of silica glass filaments forming the weft silica glass yarn.)

The flatness of the silica glass cloth is preferably 1.90 or less, more preferably 1.88 or less, still more preferably 1.85 or less. The lower limit of the flatness of the silica glass cloth is preferably low, and is hence 1.00.

EXAMPLES

Hereinafter, the present invention is specifically described by way of Examples and Comparative Examples, but is not limited to the following Examples.

Example 1

As a silica glass ingot serving as a raw material, a synthetic silica glass ingot having a diameter of 121 mm and a length of 2,000 mm was prepared, and cylindrical grinding was repeated while the roundness thereof was measured. Finally, a silica glass ingot having a roundness of 20 μm with a diameter of 120 mm and a length of 1,900 mm was obtained.

In a cylindrical grinding step, the silica glass ingot was held at both chucks of a cylindrical grinder, and was subjected to rough grinding four times with a maximum cutting amount of 0.02 mm through use of a grinding stone with a #120/140 diamond wheel. After the rough grinding, the silica glass ingot was removed from the cylindrical grinder, and a sample having a length of 10 mm was cut out from an end portion having been subjected to the grinding.

The roundness thereof was measured to be 60 μm with ROUND TEST RA-2200AS manufactured by Mitutoyo Corporation.

Next, the silica glass ingot having been subjected to the rough grinding was set on the cylindrical grinder again, and was subjected to finishing processing twice with a maximum cutting amount of 0.007 mm through use of a grinding stone with a #325/400 diamond wheel. After the processing, a sample for roundness measurement was similarly cut out, and the roundness was measured to be 10 μm.

In the resistance heating electric furnace illustrated in FIG. 2, the obtained silica glass ingot was heated and drawn to produce silica glass thick fibers each having a diameter of 230 μm. In this case, the outer diameter of each of the silica glass thick fibers was measured by the laser type outer diameter measuring device 44, and the insertion speed V1 of the silica glass ingot 20 into the resistance heating electric furnace, and the winding speed V2 of each of the silica glass thick fibers were subjected to feedback control. A temperature distribution in the resistance heating electric furnace was minimized through use of the four gas introduction pipes 48 illustrated in FIG. 4 as introduction ports for nitrogen, which was a protective gas for the resistance heating electric furnace, and the local variation in outer diameter of the silica glass thick fiber was suppressed.

Next, as illustrated in FIG. 3, 70 silica glass thick fibers 43 were introduced at one time into flame obtained from 70 wide oxyhydrogen flame burners B1 arranged in parallel while a feed speed thereof was controlled through control of the rotation number of the feed roller 53. Simultaneously with this, the silica glass thick fibers 43 were wound up by the winder 49 while being bundled from the opposite direction of the burners through the sizing applicator 50 and the condenser 47. Thus, a silica glass strand formed of 70 filaments each having a diameter of 3.7 μm was produced.

The obtained silica glass strand was twisted with 16 twists/m by a twisting machine to produce a silica glass yarn.

Further, through use of the silica glass yarn, a plain-woven silica glass cloth having a weave density of 95 warps/inch (3.74 warps/mm) and 95 wefts/inch (3.74 wefts/mm), a width of 1 m, and a length of 1,000 m was produced.

Subsequently, the silica glass cloth was subjected to opening treatment through use of a high-pressure water jet in which a plurality of small-diameter rotary nozzles each having a diameter of from 0.1 mm to 0.2 mm were arranged at equal intervals in a width direction of the silica glass cloth.

After that, the silica glass cloth having been subjected to the opening treatment was subjected to surface treatment application with an aminosilane surface treatment agent through use of a vertical applicator.

In Example 1, two trials were conducted in spinning and in producing the silica glass cloth from the obtained silica glass yarn, and the resultant silica glass yarns were regarded as silica glass yarns of Examples 1-1 and 1-2 and the resultant silica glass cloths were regarded as silica glass cloths of Examples 1-1 and 1-2.

1. Evaluation of Silica Glass Yarn

Regarding the obtained silica glass yarn, the yarn habit density of the silica glass yarn, and the tensile strength and the breaking start strength of the silica glass yarn were measured by the above-mentioned measuring methods. The results of the yarn habit are shown in Table 1, and the results of the tensile strength and the breaking start strength of the silica glass yarn are shown in Table 2.

2. Evaluation of Silica Glass Cloth

Regarding the obtained silica glass cloth, the cloth thickness was measured by the above-mentioned measuring method, and an average value thereof was calculated. Specifically, at five measuring points apart from each other by 75 mm or more, the cloth thickness was measured with the variable measuring force type digimatic micrometer "Soft Touch Micro CLM2-10QBM" manufactured by Mitutoyo Corporation under measuring pressures of 63.2 kPa and 157.9 kPa. An average value at the five points, a variation coefficient thereof, and a ratio of the average value of the cloth thickness measured under a measuring pressure of 63.2 kPa to the average value of the cloth thickness measured under a measuring pressure of 157.9 kPa were calculated. The results are shown in Table 3.

In addition, regarding the smoothness of the surface of the obtained silica glass cloth, the flatness, luster, and fluff were evaluated by the following methods. The results are shown in Table 4.

Evaluation was made as described below. Each of the silica glass cloths of Examples and Comparative Examples was pulled out with a roll and laid on a flat table. Then, the silica glass cloth was visually evaluated by applying a light source having a luminance of 10,000 lux obliquely from above.

<Flatness>

The flatness was quantified by the following expression (1) as an indicator of the degree of opening.

[Mathematical 3]

$$\text{Flatness} = T_C/T_{ABS} \quad (1)$$

In the expression (1), $T_C$ represents a thickness of the silica glass cloth, and $T_{ABS}$ represents an average thickness of the silica glass cloth when it is assumed that the silica glass cloth is ultimately opened.

$T_{ABS}$ was calculated by substituting each parameter of the silica glass cloth into the following expression (6) described above.

[Mathematical 4]

$$T_{ABS} = (D_{Wf}^2 \times N_{Wfy} \times N_{Wf}) + (D_{Ff}^2 \times N_{Fy} \times N_{Ff}) \quad (6)$$

Regarding each of Examples and Comparative Examples, the ultimate silica glass cloth thickness $T_{ABS}$ was calculated by the expression (6) as described below.

$T_{ABS}$ of Example 1 and Comparative Example 1=0.0072 (mm)

$T_{ABS}$ of Example 2 and Comparative Example 2=0.0148 (mm)

The results of the calculated flatness of the silica glass cloth through use of the above-mentioned values are shown in Table 4. In addition, the flatness was evaluated as follows: a case of having a flatness of 1.90 or less was represented by Symbol "o"; a case of having a flatness of from 1.91 to 2.00 was represented by Symbol "Δ"; and a case of having a flatness of 2.01 or more was represented by Symbol "×".

<Luster>

The luster was evaluated, by utilizing the fact that luster varies depending on waviness and yarn habits on the surface of the silica glass cloth, as follows: a case in which no variation in luster was observed was represented by Symbol "o"; a case in which slight variation in luster was observed was represented by Symbol "Δ"; and a case in which significant variation in luster was observed was represented by Symbol "×".

<Fluff>

The fluff was evaluated as follows: a case of 10 pieces/m² or less was represented by Symbol "o"; a case of 11 pieces/m² or more and 20 pieces/m² or less was represented by Symbol "Δ"; and a case of 21 pieces/m² or more was represented by Symbol "×".

Example 2

A silica glass strand was produced by the same method as in Example 1 except that the filament diameter was changed from 3.7 μm to 5.3 μm, and the number of filaments was changed from 70 to 100, and then a silica glass yarn was produced by applying twists of 12 twists/m to the silica glass strand.

Further, a plain-woven silica glass cloth having a weave density of 66 warps/inch (2.60 warps/mm) and 68 wefts/inch (2.68 wefts/mm) was produced through use of the above-mentioned silica glass yarn by the same method as in Example 1. After that, the plain-woven silica glass cloth was subjected to the opening treatment under the same opening conditions as in Example 1.

In Example 2, two trials were conducted in spinning and in producing the silica glass cloth from the obtained silica glass yarn, and the resultant silica glass yarns were regarded as silica glass yarns of Examples 2-1 and 2-2 and the resultant silica glass cloths were regarded as silica glass cloths of Examples 2-1 and 2-2.

The obtained silica glass yarns and silica glass cloths were evaluated by the same methods as in Example 1. The results are shown in Tables 1 to 4.

3. Evaluation of Board

A microstripline circuit board was formed through use of the obtained silica glass cloth, and the stability of a characteristic impedance was evaluated.

The board thickness is preferably 100 μm or more in order to measure a characteristic impedance through a microstripline. Therefore, a characteristic impedance measuring board was produced though use of two layers of the silica glass cloths of Example 2-1 and Comparative Example 2-1 each having a cloth thickness of about 30 μm and evaluated.

A sectional structure of the characteristic impedance measuring board is illustrated in FIG. 8. In FIG. 8, there are illustrated a line 100, a ground 102, a silica glass cloth 103, and a prepreg 104.

The obtained silica glass cloth 103 was impregnated with an epoxy resin containing 50 mass % of a silica glass filler to produce the prepreg 104 formed of the silica glass cloth 103 and the epoxy resin. The ratios of the silica glass cloth 103 and the epoxy resin in the obtained prepreg 104 were 40 mass % and 60 mass %, respectively.

Two layers of the prepreg 104 were stacked and further heated and pressurized together with copper foils stacked on both outer surfaces thereof to produce a double-sided copper-clad laminate (double-sided CCL), which was used as a characteristic impedance measuring board.

The thickness of the characteristic impedance measuring board was 100 μm, and the line 100 to be evaluated was a microstripline which was formed on both surfaces of the characteristic impedance measuring board and had a line width of 100 μm and a line length of 30 mm.

A characteristic impedance Z was measured with TDR54754A manufactured by Agilent Technologies, Inc., and a difference between the maximum value and the minimum value thereof was evaluated as variation.

The start-up time of a TDR pulse was set to 20 ps, and measurement was performed three times. The values at both ends of the data were excluded. After that, the difference (maximum value-minimum value) of the average values of the characteristic impedances Z at respective TDR times (53.4 ns to 54.4 ns) was defined as variation in characteristic impedance Z.

The characteristic impedance was evaluated as follows: a case in which the variation in characteristic impedance Z was less than 2% of the characteristic impedance Z was represented by Symbol "o"; and a case in which the variation in characteristic impedance Z was equal to or more than 2% was represented by Symbol "×". The evaluation results are shown in Table 5.

Comparative Example 1

A silica glass thick fiber having a diameter of 230 μm was produced by the same method as in Example 1 except that the silica glass ingot serving as a raw material was not subjected to cylindrical grinding, and then a silica glass strand formed of 70 silica glass filaments each having a silica glass filament diameter of 3.7 μm was produced by the same method as in Example 1, and then a silica glass yarn was produced by twisting the silica glass strand with 16 twists/m.

Further, a plain-woven silica glass cloth having a weave density of 95 warps/inch (3.74 warps/mm) and 95 wefts/inch (3.74 wefts/mm), a width of 1 m, and a length of 1,000 μm was produced through use of the above-mentioned silica glass yarn by the same method as in Example 1. After that, the plain-woven silica glass cloth was subjected to the opening treatment under the same opening conditions as in Example 1.

In Comparative Example 1, two trials were conducted in spinning and in producing the silica glass cloth from the obtained silica glass yarn, and the resultant silica glass yarns were regarded as silica glass yarns of Comparative Examples 1-1 and 1-2 and the resultant silica glass cloths were regarded as silica glass cloths of Comparative Examples 1-1 and 1-2.

The obtained silica glass yarns and silica glass cloths were evaluated by the same methods as in Example 1. The results are shown in Tables 1 to 4.

Comparative Example 2

A silica glass thick fiber having a diameter of 230 μm was produced by the same method as in Example 1 except that the silica glass ingot serving as a raw material was not subjected to cylindrical grinding, and then a silica glass strand formed of 100 silica glass filaments each having a silica glass filament diameter of 5.3 μm was produced by the same method as in Example 2 for the other conditions, and then a silica glass yarn with 12 twists/m was produced by twisting the silica glass strand.

Further, a plain-woven silica glass cloth having a weave density of 66 warps/inch (2.60 warps/mm) and 68 wefts/inch (2.68 wefts/mm) was produced through use of the above-mentioned silica glass yarn by the same method as in Example 1. After that, the plain-woven silica glass cloth was subjected to the opening treatment under the same opening conditions as in Example 1.

In Comparative Example 2, two trials were conducted in spinning and in producing the silica glass cloth from the obtained silica glass yarn, and the resultant silica glass yarns were regarded as silica glass yarns of Comparative Examples 2-1 and 2-2 and the resultant silica glass cloths were regarded as silica glass cloths of Comparative Examples 2-1 and 2-2.

The obtained silica glass yarns and silica glass cloths were evaluated by the same methods as in Example 1. The results are shown in Tables 1 to 4.

In addition, the silica glass cloth of Comparative Example 2-1 was impregnated with an epoxy resin containing 50 mass % of a silica glass filler to produce a prepreg formed of the silica glass cloth and the epoxy resin. The ratios of the silica glass cloth and the epoxy resin in the obtained prepreg were 40 mass % and 60 mass %, respectively.

Two layers of the prepreg were stacked and further heated and pressurized together with copper foils stacked on both outer surfaces thereof to produce a double-sided copper-clad laminate (double-sided CCL), and the double-sided copper-clad laminate was evaluated in the same manner as in Example 2-1. The results are shown in Table 5.

TABLE 1

Results of silica glass yarn

|  | Example 1-1 | Example 1-2 | Example 2-1 | Example 2-2 | Comparative Example 1-1 | Comparative Example 1-2 | Comparative Example 2-1 | Comparative Example 2-2 |
|---|---|---|---|---|---|---|---|---|
| Number of yarn habits (piece(s)/yarn) | 3 | 4 | 1 | 0 | 10 | 9 | 6 | 7 |
| Yarn habit density (piece(s)/cm) | 0.075 | 0.100 | 0.025 | 0.000 | 0.250 | 0.225 | 0.150 | 0.175 |

TABLE 2

Results of silica glass yarn

|  | Tensile strength (GPa) | Breaking start strength (GPa) | Breaking start strength/tensile strength (%) |
|---|---|---|---|
| Example 1-1 | 3.37 | 3.37 | 100.0 |
| Example 1-2 | 3.51 | 3.11 | 89.6 |
| Example 2-1 | 2.41 | 2.28 | 94.6 |
| Example 2-2 | 2.51 | 2.14 | 86.6 |
| Comparative Example 1-1 | 3.36 | 3.01 | 88.6 |
| Comparative Example 1-2 | 3.59 | 3.25 | 90.5 |
| Comparative Example 2-1 | 2.37 | 2.17 | 91.6 |
| Comparative Example 2-2 | 2.54 | 2.20 | 85.3 |

TABLE 3

Results of silica glass cloth

|  | Average value of cloth thickness | | | Variation coefficient of thickness | |
|---|---|---|---|---|---|
|  | Under 63.2 kPa (mm) | Under 157.9 kPa (mm) | 63.2 kPa/ 157.9 kPa (%) | Under 63.2 kPa (%) | Under 157.9 kPa (%) |
| Example 1-1 | 0.0142 | 0.0136 | 104 | 4 | 3 |
| Example 1-2 | 0.0147 | 0.0137 | 107 | 6 | 4 |
| Example 2-1 | 0.0292 | 0.0278 | 105 | 4 | 2 |
| Example 2-2 | 0.0282 | 0.0272 | 104 | 2 | 1 |
| Comparative Example 1-1 | 0.0169 | 0.0143 | 118 | 16 | 12 |
| Comparative Example 1-2 | 0.0178 | 0.0146 | 122 | 18 | 15 |
| Comparative Example 2-1 | 0.0345 | 0.0284 | 121 | 20 | 17 |
| Comparative Example 2-2 | 0.0342 | 0.0286 | 120 | 18 | 13 |

TABLE 4

Results of silica glass cloth

|  | Flatness | Luster | Fluff | Comprehensive evaluation |
|---|---|---|---|---|
| Example 1-1 | 1.90 | ○ | ○ | ○ | ○ |
| Example 1-2 | 1.90 | ○ | ○ | ○ | ○ |
| Example 2-1 | 1.87 | ○ | ○ | ○ | ○ |
| Example 2-2 | 1.83 | ○ | ○ | ○ | ○ |
| Comparative Example 1-1 | 1.98 | Δ | ○ | Δ | X |
| Comparative Example 1-2 | 2.02 | X | ○ | Δ | X |
| Comparative Example 2-1 | 1.92 | Δ | Δ | X | X |
| Comparative Example 2-2 | 1.93 | Δ | ○ | Δ | X |

Note: Table 4 has columns Flatness, Luster, Fluff, Comprehensive evaluation.

TABLE 5

Results of silica glass cloth

|  | Z | Z variation | Variation range (%) | Evaluation |
|---|---|---|---|---|
| Example 2-1 | 50 Ω | 0.9 Ω | 1.8 | ○ |
| Comparative Example 2-1 | 53 Ω | 1.8 Ω | 3.4 | X |

As shown in Tables 1 to 5, the silica glass cloths of Examples 1 and 2, which were each obtained from the silica glass yarns each having fewer bending points ascribed to the yarn habits, had excellent flatness, no variation in luster, and suppressed fluff, and further were excellent also in stability of a characteristic impedance.

REFERENCE SIGNS LIST

10: silica glass yarn, 12: bending point of silica glass yarn, 13: curved portion that is not bending point, 14: silica glass filament, 15: warp silica glass yarn in ultimately opened state, 16: reference surface, 18: silica glass strand, 20: silica glass ingot, 42: resistance heating electric furnace, 43: silica glass thick fiber, 44: laser type outer diameter measuring device, 46: core tube, 47: condenser, 48: gas introduction pipe, 49: winder, 50: sizing applicator, 53: feed roller, 61: winding speed control unit, 62: ingot feed speed control unit, 100: line, 102: ground, 103: silica glass cloth, 104: prepreg, B1: wide oxyhydrogen flame burner, F1: burner flame, M: high-accuracy winding machine, r: radius of curvature, V1: insertion speed of silica glass ingot, V2: winding speed of silica glass thick fiber, θ: bending angle.

The invention claimed is:

1. A high-frequency circuit board silica glass yarn, which has a yarn habit density of 0.10 piece/cm or less of yarn habits each of the yarn habits having a bending point with a radius of curvature of 5 mm or less and having a bending angle of 120° or less,
    wherein silica glass filaments forming the silica glass yarn each have a filament diameter of from 3.0 μm to 10.0 μm,
    wherein a number of the silica glass filaments is from 20 to 300, and
    wherein a number of twists of the silica glass yarn is from 4 twists/m to 24 twists/m.

2. The high-frequency circuit board silica glass yarn according to claim 1,
    wherein the silica glass yarn has a tensile strength of 2.0 GPa or more, and
    wherein the silica glass filaments forming the silica glass yarn each have a breaking start strength of 80.0% or more of the tensile strength of the silica glass yarn.

3. A high-frequency circuit board silica glass cloth, which is obtained by weaving and opening using the silica glass yarn of claim 1.

4. The high-frequency circuit board silica glass cloth according to claim 3, wherein the silica glass cloth has an average value of a cloth thickness, which is measured with an electronic micrometer under a measuring pressure of 63.2 kPa, of from 100% to 110% of an average value of a cloth thickness, which is measured with the electronic micrometer under a measuring pressure of 157.9 kPa.

5. The high-frequency circuit board silica glass cloth according to claim 3, wherein the silica glass cloth has a variation coefficient of a cloth thickness, which is measured with an electronic micrometer under a measuring pressure of 63.2 kPa, within 10%.

6. A high-frequency circuit board silica glass cloth, which is obtained by weaving and opening using a silica glass yarn having a yarn habit density of 0.10 piece/cm or less of yarn habits each having a bending point with a radius of curvature of 5 mm or less and a bending angle of 120° or less,
    wherein the silica glass cloth has an average value of a cloth thickness, which is measured with an electronic micrometer under a measuring pressure of 63.2 kPa, of from 100% to 110% of an average value of a cloth thickness, which is measured with the electronic micrometer under a measuring pressure of 157.9 kPa.

7. A high-frequency circuit board silica glass cloth, which is obtained by weaving and opening using a silica glass yarn having a yarn habit density of 0.10 piece/cm or less of yarn habits each having a bending point with a radius of curvature of 5 mm or less and a bending angle of 120° or less,
    wherein the silica glass cloth has a variation coefficient of a cloth thickness, which is measured with an electronic micrometer under a measuring pressure of 63.2 kPa, within 10%.

8. A high frequency circuit board comprising the high-frequency circuit board silica glass cloth according to claim 3, wherein a variation in characteristic impedance of the high frequency circuit board is less than 2%.

9. The high-frequency circuit board silica glass yarn according to claim 1, wherein:
    the silica glass filaments are formed by providing a silica glass ingot as raw material;
    the silica glass ingot is polished by cylindrical grinding to provide the silica glass ingot with a roundness of 50 μm or less;
    the silica glass filaments are further formed by steps including feeding the polished silica glass ingot at a controlled feed speed into a furnace and controlling a winding of the silica glass filaments.

10. The high-frequency circuit board silica glass yarn according to claim 9, wherein the silica glass ingot has a roundness of 30 μm or less.

11. The high-frequency circuit board silica glass yarn according to claim 9, wherein the silica glass ingot has a roundness of 20 μm or less.

12. The high-frequency circuit board silica glass yarn according to claim 1, wherein a $SiO_2$ composition amount in the silica glass filament is from 98.0 mass % to 100.0 mass %.

13. The high-frequency circuit board silica glass yarn according to claim 12, wherein $SiO_2$ composition amount in the silica glass filament is from 99.0 mass % to 100.0 mass %.

14. The high-frequency circuit board silica glass yarn according to claim 12, wherein $SiO_2$ composition amount in the silica glass filament is from 99.5 mass % to 100.0 mass %.

* * * * *